United States Patent [19]

Wirz

[11] 4,354,819
[45] Oct. 19, 1982

[54] MULTI-PIVOTABLE MOLD CARRIER CLAMPING APPARATUS

[75] Inventor: Jakob Wirz, Territet-Montreux, Switzerland

[73] Assignee: Spühl AG, St. Gallen, Switzerland

[21] Appl. No.: 265,313

[22] Filed: May 20, 1981

[30] Foreign Application Priority Data

May 30, 1980 [CH] Switzerland ............... 4238/80

[51] Int. Cl.³ ................ B29C 1/00; B29C 3/00; B29C 7/00
[52] U.S. Cl. ..................... 425/409; 425/4 R; 425/443; 425/450.1
[58] Field of Search ........... 425/193, 406, 409, 411, 425/441, 442, 443, 450.1, DIG. 220, DIG. 222, 589, 592, 593, 4 R

[56] References Cited

U.S. PATENT DOCUMENTS

| | | | |
|---|---|---|---|
| 3,140,513 | 7/1964 | Campbell et al. | 425/411 X |
| 3,208,373 | 9/1965 | Bachelier | 425/DIG. 220 |
| 3,523,328 | 8/1970 | Huff et al. | 425/589 |
| 3,577,591 | 5/1971 | Ricards et al. | 425/409 X |
| 3,667,890 | 6/1972 | Rusmini | 425/406 |
| 3,804,568 | 4/1974 | Rees | 425/442 X |
| 3,981,671 | 9/1976 | Edwards | 425/450.1 X |
| 4,007,679 | 2/1977 | Edwards | 425/409 X |
| 4,212,614 | 7/1980 | Holzinger | 425/4 R X |
| 4,269,587 | 5/1981 | Tranter | 425/409 X |

*Primary Examiner*—J. Howard Flint, Jr.
*Attorney, Agent, or Firm*—Sughrue, Mion, Zinn, Macpeak and Seas

[57] ABSTRACT

A pair of mating mold halves are mounted between upper and lower clamp plates 25, 22. The lower clamp plate is driven by a hydraulic unit 17 mounted to a base plate 16, which is rotatably disposed on a tiltable table plate 7. The upper clamp plate is journaled between the arms 26, 28 of a yoke pivotally mounted on the base plate and controlled by hydraulic units 29 coupled between the yoke arms and the upper clamp plate. This compact multi-pivotal arrangement affords a large separation stroke between the two clamp plates without, by reason of the lateral pivoting of the yoke and upper clamp plate, requiring any additional overhead or ceiling clearance space.

8 Claims, 2 Drawing Figures

MULTI-PIVOTABLE MOLD CARRIER CLAMPING APPARATUS

BACKGROUND OF THE INVENTION

This invention relates to a multi-pivotable tool carrier or clamp, particularly for mounting and manipulating at least two mating injection molds or dies for the manufacture of articles from plastics, such as foam expanded polyurethane.

A tool carrier of this general type is marketed by the German company Battenfeld Maschinenfabriken GmbH, under the tradename Type WK. In this known tool carrier an upper, second clamp plate is pivotably arranged opposite a lower, first clamp plate. A hydraulically activated piston-cylinder unit implements the pivotal movement; it is hinged at one end to a base plate and at the other end to the second clamp plate. With this drive unit the second clamp plate can be pivoted approximately 100° from its position parallel to the first clamp plate to thereby open and close the tool carrier and the molds mounted on and between the clamp plates. By these measures the mold halves are easily accessible. If this tool carrier is used, for example, for expand polyurethane manufacturing, then the finished articles can be easily removed from the mold. In other words, after the separation and withdrawal of the upper half of the mold the articles can easily be removed from the lower half of the mold. This advantage is present to an equal degree when the carrier serves in holding other tools, for example when the products are formed between two mold halves by means other than plastic expansion, such as by die casting.

In this conventional tool carrier the pivotable second clamp plate is hinged to two beams which extend up at a right angle from the base plate. When the base plate is horizontal these beams thus stand vertical, and the opened second clamp plate is connected at the upper ends thereof. This conventional tool carrier thus has a significant vertical height when the mold halves are separated and opened, relative to the height of the carrier when the unit is closed, i.e. when both clamp plates lie parallel to each other. This constitutes a distinct disadvantage in that the ceiling height of the factory room must be taken into consideration in a limiting or restrictive sense, particularly when the pivotable second clamp plate has a large area base surface, which is often necessary or at least desirable. As a result this conventional tool carrier is only usable for relatively small molds in which small articles are formed, whereby no large parallel stroke is necessary between the two clamp plates.

SUMMARY OF THE INVENTION

An object of the invention is to provide a tool carrier in which the above mentioned disadvantages can be avoided; the tool carrier is characterized by the second clamp plate being pivotally mounted on a yoke which is itself pivotably hinged to the base plate.

With this arrangement the vertical distance between the pivot axis of the second clamp plate and the base plate can be varied by pivoting the yoke. This pivot axis lies at the greatest distance above the base plate when the yoke projects perpendicularly upward therefrom, whereat the second clamp plate is parallel to the first clamp plate beneath it. When the yoke is inclined relative to the base plate the vertical distance between the pivot axis (hinge point of the second clamp plate on the yoke) and the base plate is substantially reduced, although in this position the second clamp plate is in its upwardly hinged orientation and the mold is opened. The relative increase in height caused by hinging the second clamp plate upwardly is thus compensated for by the lowering of its pivot axis, so that despite the opening of the mold the total height of the tool carrier is not increased. The tool carrier can thus provide a large parallel separation between the two clamp plates at a given ceiling height, and still enable effective opening and closing movements.

DETAILED DESCRIPTION OF THE PREFERRED EMBODIMENTS

Figure 1:
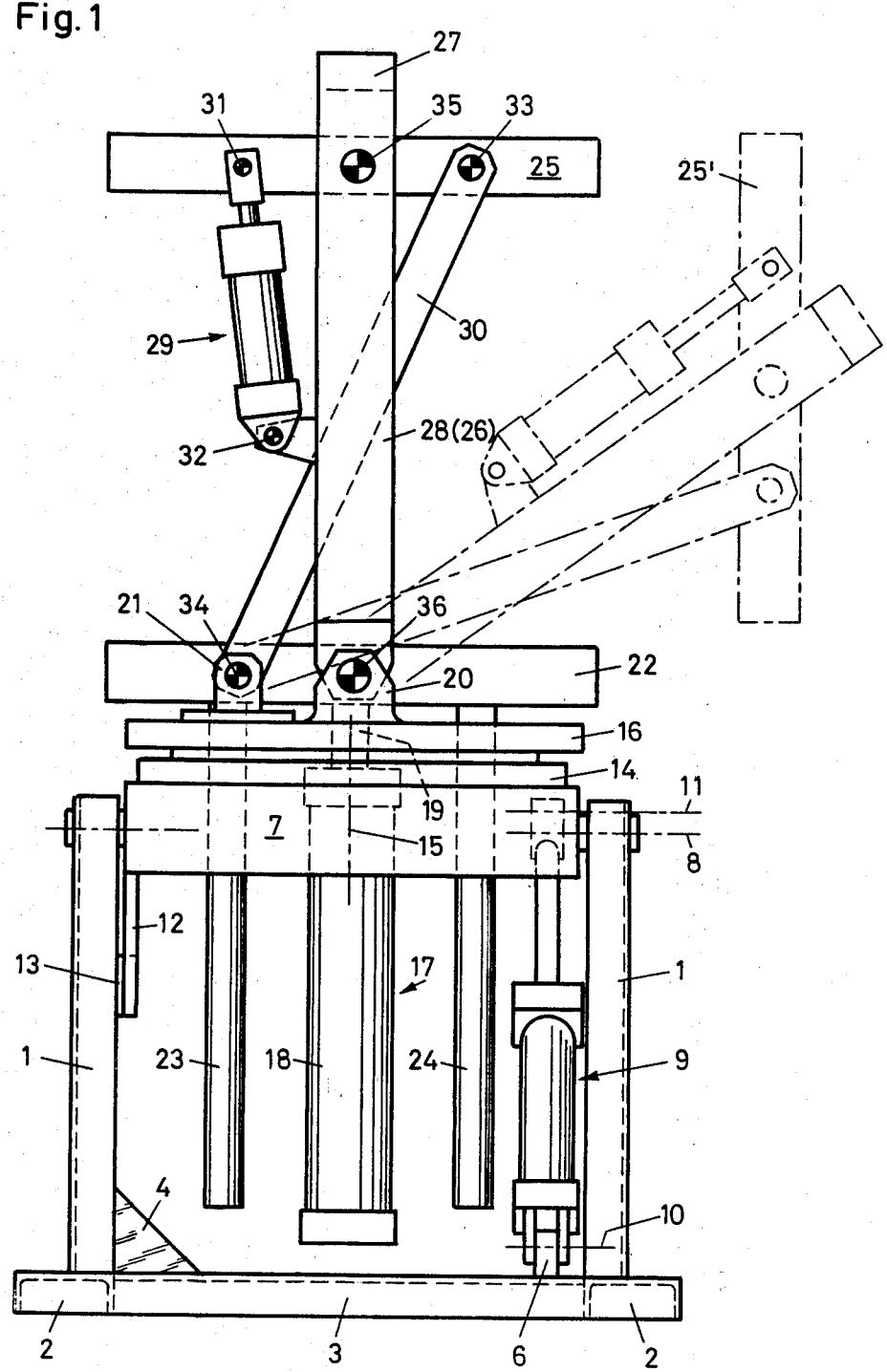
FIG. 1 shows a side elevation of a tool carrier according to the present invention with the base plate in its horizontal position, with a maximum separation distance between the two clamp plates, and with the pivoted opened position shown in broken lines.
Figure 2:
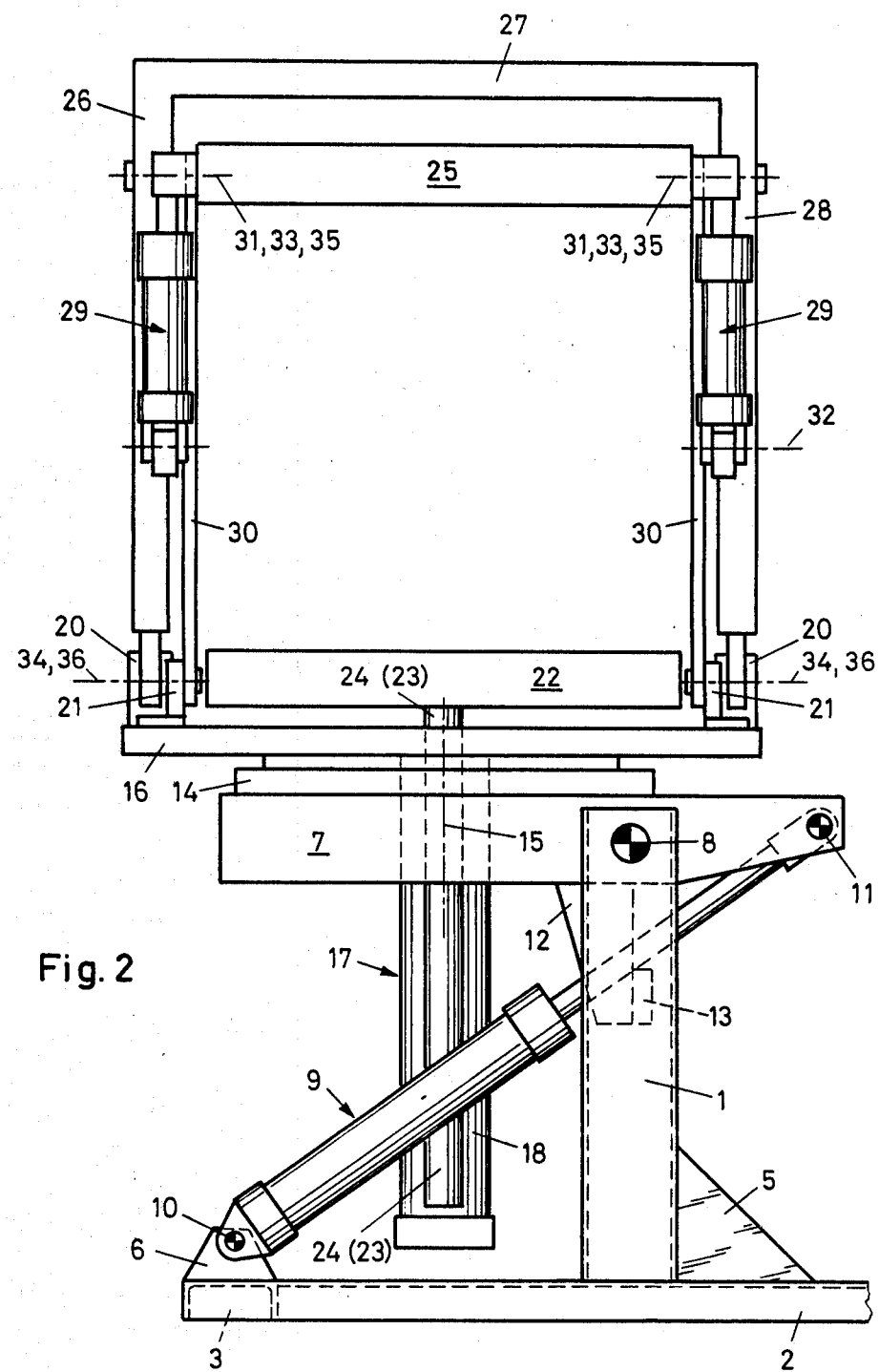
FIG. 2 shows a front elevation of the tool carrier according to FIG. 1.

The tool carrier has a base frame consisting of elements 1 through 6, which may be welded together. A table plate 7 is pivotably mounted about a horizontal axis 8 to the base frame, and its movements are controlled by a hydraulic piston and cylinder unit 9. The latter is hinged at one end 10 to the base frame element 6 and at its other end 11 at the plate 7. A limiting knee 12 is provided on the plate 7, and abuts a stop 13 rigidly affixed to the frame element 1 when the table plate is in a horizontal position. The unit 9 can be retracted until the table plate and components mounted thereon are rotated through about 90° (not shown), whereat the plate is vertically oriented.

The plate 7 carries a slewing ring 14 which can be rotated about an axis 15. A base plate 16 having a generally rectangular configuration is rotatably mounted in the slewing ring 14. The base plate 16 is part of the closing unit of the tool carrier. The cylinder 18 of a hydraulic piston and cylinder unit 17 is connected to the base plate 16, and its piston rod 19 projects through an opening in the base plate. The base plate 16 carries two pairs of mounting blocks 20 and 21.

A first, lower clamp plate 22 of the closing unit lies above the base plate 16, and is supported on the piston rod 19 of the unit 17. The clamp plate 22 has a square or rectangular configuration, and is vertically movable by means of the piston rod 19. Two parallel rods 23 and 24 serve to guide the clamp plate 22; they are slidably disposed in bores in the base plate 16 and are connected at their upper ends to the clamp plate.

The closing unit, which includes the base plate 16, the drive unit 17 and the guide rods 23, 24, further comprises a second, upper clamp plate 25, a U-shaped yoke 26, 27 and 28, a pair of hydraulic piston and cylinder drive units 29 and a pair of coupler straps 30. Each drive unit 29 is hinged at one end 31 to the second clamp plate 25, and at the other end 32 to the yoke arms 26, 28. Each coupler strap 30 is hinged at one end 33 to the second clamp plate 25, and at the other end 34 to the base plate 16 at a mounting block 21. The second clamp plate 25 is pivotable on two trunion pins about an axis 35 in the yoke arms. As seen in FIG. 1, the axis/pins 35 lies between the two axes/pins 31 and 33. The straps 30 constitute guide members for the second clamp plate 25. The yoke 26–28 together with the drive units 29 and the straps 30 can be pivoted laterally as illustrated with broken lines in FIG. 1, whereat the second clamp plate is then located in a vertical position 25'. The yoke 26–28 is pivotable in the two mounting blocks 20 about an axis 36.

In an alternate embodiment (not shown) further hydraulic piston and cylinder drive units could be provided in place of the straps 30. These further drive units could also be hinged at one end to the base plate 16 and at the other end to the yoke 26–28, and their operation could pivot the yoke relative to the base plate. This arrangement would be more costly than the illustrated embodiment, however, because control means would have to be provided for the further drive unit, while the straps 30 are passive and require no control. The control of the further drive unit would also have to be precisely coordinated with the control of the drive units 29 to maintain a desired path of motion during the rotation of the second clamp plate from its parallel position relative to the first clamp plate 22 shown in FIG. 1 into the position 25'. This is achieved automatically with the straps 30.

The entire closing unit of the tool carrier can be rotated about the axis 15 either manually or by an electric motor (not shown) driving a pinion gear engaging teeth on the slewing ring 14. With the drive unit 9 the entire closing unit together with the table plate 7 can be rotated about the axis 8. This enables the closed mold to be tilted after or during injection, which is sometimes useful in venting trapped gases. The drive unit 17 can raise the first clamp plate 22 to a point where a pair of mold halves (not shown) are tightly clamped between the two plates 22 and 25 to close the unit and enable injection. To open the closing unit the first clamp plate 22 is moved downwardly, back toward the base plate 16. To facilitate the removal of the molded article from the lower mold half, the second clamp plate 25 is then rotated into the position 25' seen in FIG. 1 by the drive units 29.

The described tool carrier, despite having a large parallel span or separation distance between the two clamp plates 22 and 25, has a lower overall height when the mold is opened, i.e. when the second clamp plate 25 is in its position 25', than when the two clamp plates are closed and parallel to each other. This means that in a given room a tool carrier with substantial height which is capable of manufacturing tall articles can be set up, since opening the second clamp plate does not increase the height of the tool carrier. This pivoting of the second clamp plate 25 into the position 25' can also be an advantage in exchanging one set of molds for another, since the new mold can then be easily lowered into place on the vertically accessible first clamp plate 22.

Further, when the upper mold half is attached to the second clamp plate 25, it advantageously lies significantly lower when the clamp plate is rotated into the position 25' than with the conventional tool carrier of the type described earlier. This enables more easy access to the exposed upper mold half, for example to remove the manufactured article therefrom or to clean or spray it with a release agent.

What is claimed is:

1. A tool carrier, particularly for mounting expanded plastic molds, comprising: a base frame (1–6), a table plate (7) mounted to the base frame and pivotable about a horizontal axis (8), a closing unit rotatably mounted on the table plate, said closing unit including a base plate (16) carrying upper and lower clamp plates (25, 22), a plurality of guide members (30, 23, 24) for the clamp plates, and first drive unit means (17) for moving the two clamp plates towards or away from each other to close or open the unit, the lower clamp plate lying adjacent the base plate and movable by means of said guide members (23, 24) parallel to the base plate (16), second drive unit means (29) disposed between the base plate and the upper clamp plate for pivoting the upper clamp plate relative to the lower clamp plate, a yoke (26–28) pivotally connected to the base plate, and means pivotally mounting the upper clamp plate in the yoke.

2. A tool carrier according to claim 1, wherein the second drive unit means is of controllably variable length during operation, and is hinged at one end (32) to the yoke and at the other end (31) to the upper clamp plate to pivot the upper clamp plate relative to the yoke.

3. A tool carrier according to claim 2, wherein one of the guide members comprises a coupler strap (30) hinged at one end (21) to the base plate and at the other end (33) to the upper clamp plate to control the pivoting of the yoke relative to the base plate.

4. A tool carrier according to claim 2, further comprising a controllably variable length drive unit hinged at one end to the base plate and at the other end to the yoke to pivot the yoke relative to the base plate.

5. A tool carrier according to claims 3 or 4, wherein the second drive unit means and the coupler strap are provided in pairs.

6. A tool carrier according to claim 1, further comprising a controllably variable length drive unit (9) hinged at one end (10) to the base frame and at the other end (11) to the table plate for pivoting the table plate relative to the base frame.

7. A tool carrier according to claims 4 or 6, wherein the drive units and drive unit means comprise fluid actuated piston and cylinder units.

8. A tool holder according to claim 3, wherein the upper clamp plate is hinged to the yoke at a first axis (35), to the second drive unit means at a second axis (31) and to the coupler strap at a third axis (33), the first axis lies between the second and third axes, and the coupler strap is elongated and crosses arms of the yoke.

* * * * *